United States Patent [19]

Schneider et al.

[11] Patent Number: 5,700,769

[45] Date of Patent: Dec. 23, 1997

[54] ENHANCEMENT OF ENZYME REACTIONS

[75] Inventors: Palle Schneider, Ballerup; Lars Sparre Conrad; Søren Ebdrup, both of Copenhagen; Birgitte Yde, Farum, all of Denmark

[73] Assignee: Novo Nordisk A/S, Bagsvaerd, Denmark

[21] Appl. No.: 436,375

[22] PCT Filed: Dec. 1, 1993

[86] PCT No.: PCT/DK93/00393

§ 371 Date: May 22, 1995

§ 102(e) Date: May 22, 1995

[87] PCT Pub. No.: WO94/12619

PCT Pub. Date: Jun. 9, 1994

[30] Foreign Application Priority Data

Dec. 1, 1992 [DK] Denmark ............... 1443/92

[51] Int. Cl.$^6$ ............... C11D 3/386; D06L 3/16
[52] U.S. Cl. ............... 510/305; 510/392; 510/530; 510/374; 510/375; 510/376; 510/378; 435/192; 210/632
[58] Field of Search ............... 252/102, 542, 252/154.12, DIG. 12, 401, 111; 435/192; 210/632; 510/305, 392, 530, 374, 375, 376, 378

[56] References Cited

U.S. PATENT DOCUMENTS

| 3,893,803 | 7/1975 | Kaiser ............... 8/10.2 |
| 4,432,921 | 2/1984 | Haars et al. ............... 264/109 |
| 4,623,465 | 11/1986 | Klibanov et al. ............... 210/632 |
| 4,690,895 | 9/1987 | Farrell ............... 435/278 |
| 5,147,793 | 9/1992 | Johnson et al. ............... 435/156 |
| 5,200,338 | 4/1993 | Crawford et al. ............... 435/300 |
| 5,273,896 | 12/1993 | Pedersen et al. ............... 435/192 |
| 5,288,746 | 2/1994 | Pramod ............... 252/95 |
| 5,364,554 | 11/1994 | Stanislowski et al. ............... 252/186.38 |
| 5,451,337 | 9/1995 | Liu et al. ............... 252/102 |
| 5,455,755 | 10/1995 | Convents et al. ............... 252/102 |

FOREIGN PATENT DOCUMENTS

| 0 179 486 | 10/1985 | European Pat. Off. . |
| 0 361 470 | 9/1989 | European Pat. Off. . |
| 0361470 | 4/1990 | European Pat. Off. . |
| WO 91/05839 | 5/1991 | WIPO . |
| WO 91/18683 | 10/1992 | WIPO . |
| 9412619 | 6/1994 | WIPO . |
| 9412620 | 6/1994 | WIPO . |
| 9412621 | 6/1994 | WIPO . |

OTHER PUBLICATIONS

Sanchez et al., Physiol Plant, vol. 75, pp. 275–279 (1989).
Abstract of DD 147368.

Primary Examiner—Paul Lieberman
Assistant Examiner—Kery A. Fries
Attorney, Agent, or Firm—Steve T. Zelson, Esq.; Valeta A. Gregg, Esq.

[57] ABSTRACT

This invention relates to activation of enzymes. More specifically, the invention relates to peroxidase enhancing agents. The invention also relates to methods of oxidizing a substrate with a source of hydrogen peroxide in the presence of a peroxidase enzyme and a peroxidase enhancing agent. More specifically, the invention relates to a method of bleaching of dye in solutions, to a method of inhibiting the transfer of a textile dye from a dyed fabric to another fabric when said fabrics are washed together in a wash liquor, to a method of bleaching of lignin-containing material in particular bleaching of pulp for paper production, to a method of treatment of waste water from pulp manufacturing, and to a method of enzymatic polymerization and/or modification of lignin or lignin containing material.

5 Claims, 6 Drawing Sheets

ENHANCEMENT OF ENZYME REACTIONS

CROSS-REFERENCE TO RELATED APPLICATIONS

This application is a 371 of PCT/DK93/00393 filed Dec. 1, 1993, which is incorporated herein by reference.

TECHNICAL FIELD

This invention relates to activation of enzymes. More specifically, the invention relates to peroxidase enhancing agents.

The invention also relates to methods of oxidizing a substrate with a source of hydrogen peroxide in the presence of a peroxidase enzyme and a peroxidase enhancing agent. More specifically, the invention relates to a method of bleaching of dye in solutions, to a method of inhibiting the transfer of a textile dye from a dyed fabric to another fabric when said fabrics are washed together in a wash liquor, to a method of bleaching of lignin-containing material, in particular bleaching of pulp for paper production, to a method of treatment of waste water from pulp manufacturing, and to a method of enzymatic polymerization and/or modification of lignin or lignin containing material.

BACKGROUND ART

Peroxidases (E.C. 1.11.1.7) are enzymes that catalyse the oxidation of a substrate (an electron or hydrogen donor) with hydrogen peroxide. Such enzymes are known from microbial, plant and animal origins, e.g. peroxidase from *Coprinus cinereus* (cf. e.g. EP 179,486). They are typically hemoproteins, i.e. they contain a heme as a prosthetic group.

Use of peroxidase together with hydrogen peroxide or a hydrogen peroxide precursor has been suggested e.g. in bleaching of pulp for paper production, in treatment of waste water from pulp production, for improved bleaching in laundry detergents, for dye transfer inhibition during laundering, and for lignin modification, e.g. in particle board production.

The compound 2,2'-azino-bis (3-ethylbenzothiazoline-6-sulfonate), ABTS, supplied by Boehringer Mannheim, is a chromogenic substrate, and a common peroxidase and phenol oxidase assay agent. These enzymes catalyse the oxidation of ABTS by hydrogen peroxide and dioxygen, respectively, producing a greenish-blue colour, which process may be monitored photometrically.

ABTS has been found to form a stable radical cation when oxidized by a laccase enzyme (polyphenol oxidase, EC 1.10.3.2), and has been proposed to act as a redox mediator for oxidation of non-phenolic lignin model compounds [Bourbonnais R., Paice M. G.; FEBS Lett (1990) 267 99–102].

Studies on demethylation and delignification of kraft pulp by a laccase enzyme in the presence of ABTS showed that the extent of partial demethylation by laccase was increased in the presence of ABTS [Bourbonnais, R. and Paice, M. G.; Appl. Microbiol. Biotechnol. (1992) 36 823–827].

Certain oxidizable substrates, e.g. metal ions and phenolic compounds such as 7-hydroxycoumarin (7 HCm), vanillin (VAN), and p-hydroxybenzenesulfonate (pHBS), have been described as accelerators or enhancers, able to enhance bleaching reactions (cf. e.g. WO 92/18683, WO 92/18687, and Kato M. and Shimizu S., Plant Cell Physiol. 1985 26 (7), pp. 1291–1301 (cf. Table 1 in particular), or Saunders B. C., et al., Peroxidase, London, 1964, p. 141 ff).

This accelerator effect is thought to be ascribable to the formation of short-lifed radicals or other oxidised states of this substrate which participate in the bleaching or other modification of the coloured substance.

SUMMARY OF THE INVENTION

It is an object of the invention to provide an agent for enhancing the activity of peroxidase enzymes, and to provide a method of enhancing the activity of peroxidase enzymes. It has now surprisingly been found that the activity of peroxidases increases significantly in the presence of a chemical compound capable of generating a stable oxidized product which can act as an electron acceptor.

Accordingly, in its first aspect, the present invention provides an agent for enhancing the activity of a peroxidase enzyme, the agent being a substrate for the peroxidase enzyme, and capable of generating a stable electron acceptor when present in a concentration of up to 250 µM.

In its second aspect, the invention provides a method of oxidizing a substrate with a peroxidase enzyme, in the presence of a source of hydrogen peroxide, and in the presence of a peroxidase enhancing agent of the invention.

In a specific aspect, the invention provides a method of inhibiting the transfer of a textile dye from a dyed fabric to another fabric when said fabrics are washed together in a wash liquor, the method comprising treatment of the wash liquor with a peroxidase enzyme in the presence of a source of hydrogen peroxide and in the presence of a peroxidase enhancing agent of the invention.

In a particular aspect, the invention provides a detergent additive capable of inhibiting the transfer of a textile dye from a dyed fabric to another fabric when said fabrics are washed together in a wash liquor, the detergent additive comprising an enzyme exhibiting peroxidase activity, a source of hydrogen peroxide, and a peroxidase enhancing agent of the invention.

In another particular aspect, the invention provides a detergent composition capable of inhibiting the transfer of a textile dye from a dyed fabric to another fabric when said fabrics are washed together in a wash liquor, the detergent composition comprising an enzyme exhibiting peroxidase activity, a source of hydrogen peroxide, and a peroxidase enhancing agent of the invention.

In another aspect, the invention provides a method of bleaching of lignin-containing material, in particular bleaching of pulp for paper production, the method comprising treatment of the lignin or lignin containing material with a peroxidase enzyme in the presence of a source of hydrogen peroxide and in the presence of a peroxidase enhancing agent of the invention.

In a further aspect, the invention provides a method of enzymatic polymerization and/or modification of lignin or lignin containing material, the method comprising treatment of the lignin or lignin containing material with a peroxidase enzyme in the presence of a source of hydrogen peroxide and in presence of a peroxidase enhancing agent of the invention.

In a yet further aspect, the invention provides a method of treatment of waste water, e.g. waste water from the chemical or pharmaceutical industry, the method comprising treatment of the waste water with a peroxidase enzyme in the presence of a source of hydrogen peroxide and in the presence of a peroxidase enhancing agent of the invention.

BRIEF DESCRIPTION OF DRAWINGS

The present invention is further illustrated by reference to the accompanying drawings, in which.

DETAILED DISCLOSURE OF THE INVENTION

Figure 1:
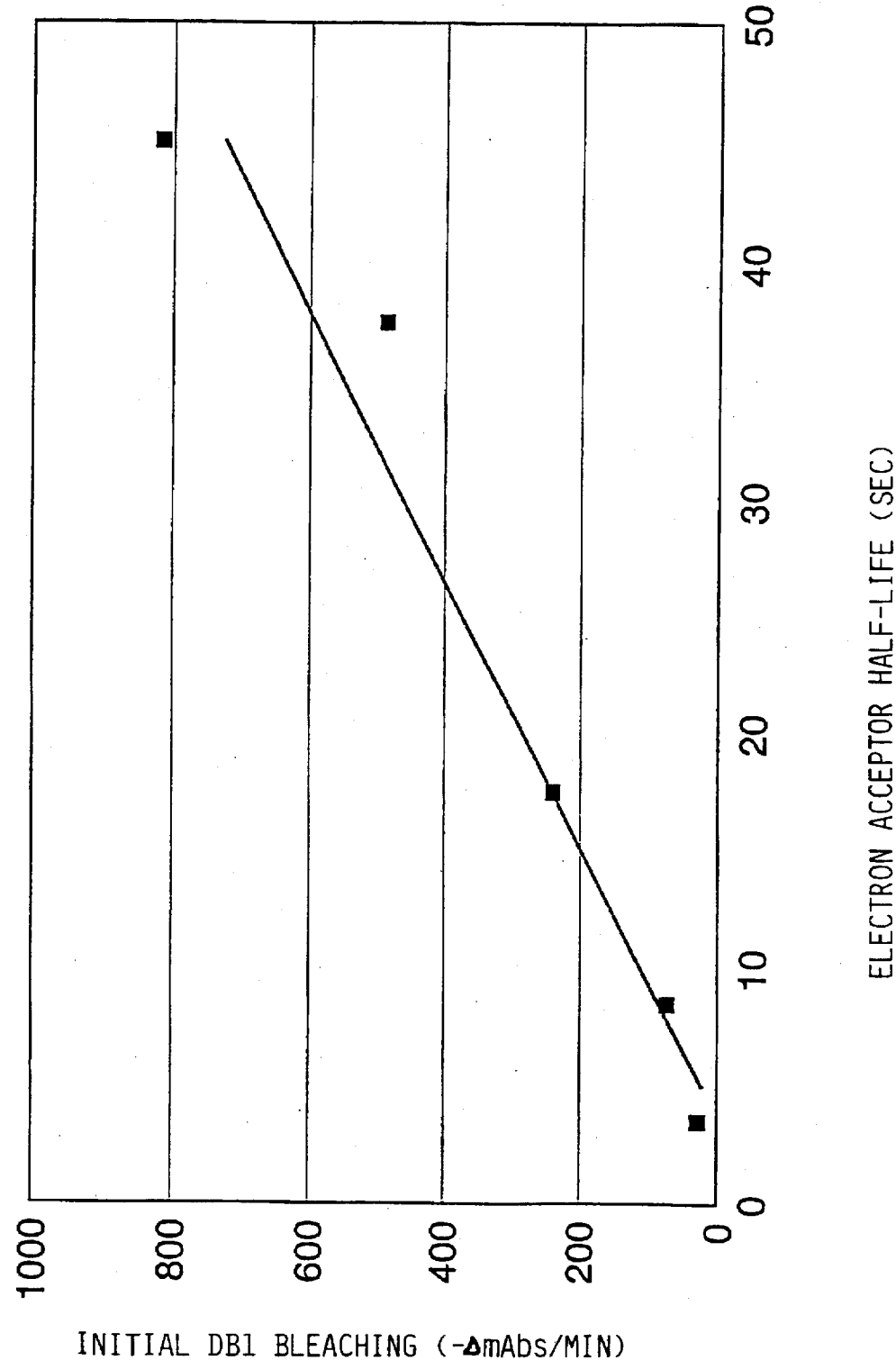
FIG. 1 shows the initial DB1 bleaching (−ΔmAbs/min) as a function of the electron acceptor half-life (seconds) at pH 8.5.

The present invention relates to a method of oxidizing an oxidizable substrate, comprising contacting the substrate with a peroxidase or a peroxidatively acting compound (defined below), a source of hydrogen peroxide and an enhancer capable of being oxidized by the peroxidase or the peroxidatively acting compound into an electron acceptor having a half-life greater than the inverse of the turnover number (defined below) of the oxidation of the enhancer.

Half-life can be determined by different methods, e.g. as described in Examples 1, 6, 7 and 8, or by other methods known in the art.

In the context of this invention the turnover number is defined as $V_{max}$ (the maximum enzymatic oxidation rate of the enhancer) divided by the initial concentration of the peroxidase.

In the context of this invention, a stable electron acceptor is defined as an acceptor with a half-life ($t_{1/2}$) of 1 msec or more, when the enhancer is present in a concentration of up to 250 μM.

In a more preferred embodiment, a stable electron acceptor is an acceptor with a half-life ($t_{1/2}$) of 10 msec or more, when the enhancer is present in a concentration of up to 250 μM.

In a most preferred embodiment, a stable electron acceptor is an acceptor with a half-life ($t_{1/2}$) of 100 msec or more when the enhancer is present in a concentration of up to 250 μM.

In a most preferred embodiment, an enhancer of the invention is an aromatic organic compound selected from the following group: 2,2'-azino-bis(3-ethylbenzothiazoline-6-sulfonate), N-methylphenothiazine, 3,3',5,5'-tetramethylbenzidine.

The enzyme employed in the method of the invention may be any peroxidase enzyme comprised by the enzyme classification EC 1.11.1.7, or any fragment derived therefrom, exhibiting peroxidase activity, or synthetic or semisynthetic derivatives thereof (e.g. porphyrin ring systems or microperoxidases, cf. e.g. U.S. Pat. No. 4,077,768; EP Patent Application 537,381, International Patent Applications WO 91/05858 and WO 92/16634). Such enzymes are known from microbial, plant and animal origins.

Preferably, the peroxidase employed in the method of the invention is producible by plants (e.g. horseradish or soy bean peroxidase) or microorganisms such as fungi or bacteria. Some preferred fungi include strains belonging to the subdivision Deuteromycotina, class Hyphomycetes, e.g. Fusarium, Humicola, Tricoderma, Myrothecium, Verticillum, Arthromyces, Caldariomyces, Ulocladium, Embellisia, Cladosporium or Dreschlera, in particular *Fusarium oxysporum* (DSM 2672), *Humicola insolens*, *Trichoderma resii*, *Myrothecium verrucana* (IFO 6113), *Verticillum alboatrum*, *Verticillum dahlie*, *Arthromyces ramosus* (FERM P-7754), *Caldariomyces fumago*, *Ulocladium chartatum*, *Embellisia alli* or *Dreschlera halodes*.

Other preferred fungi include strains belonging to the subdivision Basidiomycotina, class Basidiomycetes, e.g. Coprinus, Phanerochaete, Coriolus or Trametes, in particular *Coprinus cinereus* f. *microsporus* (IFO 8371), *Coprinus macrorhizus*, *Phanerochaete chrysosporium* (e.g. NA-12) or Trametes (previously called Polyporus), e.g. *T. versicolor* (e.g. PR4 28-A).

Further preferred fungi include strains belonging to the subdivision Zygomycotina, class Mycoraceae, e.g. Rhizopus or Mucor, in particular *Mucor hiemalis*.

Some preferred bacteria include strains of the order Actinomycetales, e.g. *Streptomyces spheroides* (ATTC 23965), *Streptomyces thermoviolaceus* (IFO 12382) or *Streptoverticillum verticillium* ssp. *verticillium*.

Other preferred bacteria include *Bacillus pumilus* (ATCC 12905), *Bacillus stearothermophilus*, *Rhodobacter sphaerides*, *Rhodomonas palustri*, *Streptococcus lactis*, *Pseudomonas purrocinia* (ATCC 15958) or *Pseudomonas fluorescens* (NRRLB-11).

Further preferred bacteria include strains belonging to Myxococcus, e.g. *M. virescens*.

Other potential sources of useful particular peroxidases are listed in Saunders B. C., op. cit., pp. 41–43.

The peroxidase may furthermore be one which is producible by a method comprising cultivating a host cell transformed with a recombinant DNA vector which carries a DNA sequence encoding said peroxidase as well as DNA sequences encoding functions permitting the expression of the DNA sequence encoding the peroxidase, in a culture medium under conditions permitting the expression of the peroxidase and recovering the peroxidase from the culture.

Particularly, a recombinantly produced peroxidase is a peroxidase derived from a *Coprinus sp.*, in particular *C. macrorhizus* or *C. cinereus* according to WO 92/16634.

In the context of this invention, peroxidatively acting compounds comprise peroxidase active fragments derived from cytochromes, hemoglobin or peroxidase enzymes, and synthetic or semisynthetic derivatives thereof, e.g. iron porphins, iron porphyrins, and iron phthalocyanine and derivatives thereof.

Industrial Applications

Methods according to the invention of oxidizing a substrate with a source of hydrogen peroxide in the presence of a peroxidase enzyme find various industrial applications.

In a preferred embodiment, the method of the invention finds application for bleaching of dye in solutions.

In another embodiment, the method of the invention finds application for dye transfer inhibition, e.g. for treatment of dyed textiles (cf. e.g. WO 92/18687) or during laundering (cf. e.g. WO 91/05839).

Accordingly, in a specific embodiment, the invention provides a method for inhibiting the transfer of a textile dye from a dyed fabric to another fabric when said fabrics are washed together in a wash liquor, the method comprising treatment of the wash liquor with a peroxidase enzyme in the presence of a source of hydrogen peroxide, and the presence of a peroxidase enhancing agent of the invention. The textile dye may be a synthetic dye such as an azo dye, or a natural or nature-identical dye.

In a third embodiment, the method of the invention finds application in bleaching of pulp for paper production. The use of a peroxidase together with hydrogen peroxide or a hydrogen peroxide precursor in bleaching of paper pulp has been described in e.g. SE 88/0673 and U.S. Pat. No. 4,690,895.

Accordingly, the invention provides a method for bleaching of lignin-containing material, in particular bleaching of pulp for paper production, which method comprises treatment of the lignin or lignin containing material with a peroxidase enzyme in the presence of a source of hydrogen peroxide and in the presence of a peroxidase enhancing agent of the invention.

In a fourth embodiment, the method of the invention finds application for lignin modification, e.g. in particle board production. Binders for producing wood composites such as fibre boards and particle boards can be made from peroxidase treated lignin (cf. U.S. Pat. No. 4,432,921).

Accordingly, the invention provides a method for enzymatic polymerization and/or modification of lignin or lignin containing material, which method comprises treatment of the lignin or lignin containing material with a peroxidase enzyme in the presence of a source of hydrogen peroxide, and the presence of a peroxidase enhancing agent of the invention.

In a fifth embodiment, the method of the invention finds application in treatment of waste water e.g. waste water from the chemical or pharmaceutical industry, from dye manufacturing, from the textile industry, or from pulp production (cf. e.g. U.S. Pat. No. 4,623,465, or JP-A 2-31887).

In a more specific aspect, the invention provides a method for treatment of waste water from dye manufacturing, from textile industry, or from pulp manufacturing, the method comprising treatment of the waste water with a peroxidase enzyme in the presence of a source of hydrogen peroxide and in the presence of a peroxidase enhancing agent of the invention.

Detergent Compositions

According to the invention, the peroxidase enhancing agent may be added as a component of a detergent composition.

In a specific aspect, the invention provides a detergent additive capable of inhibiting the transfer of a textile dye from a dyed fabric to another fabric when said fabrics are washed together in a wash liquor, the detergent additive comprising an enzyme exhibiting peroxidase activity, a source of hydrogen peroxide, and a peroxidase enhancing agent of the invention. The detergent additive may additionally comprise one or more other enzymes conventionally used in detergents such as proteases, lipases, amylases, or cellulases.

Preferably, the detergent additive is provided in the form of a granulate, preferably a non-dusting granulate, a liquid, in particular a stabilized liquid, a slurry, or in a protected form.

In another specific aspect, the invention provides a detergent composition capable of inhibiting the transfer of a textile dye from a dyed fabric to another fabric when said fabrics are washed together in a wash liquor, the detergent composition comprising an enzyme exhibiting peroxidase activity, a source of hydrogen peroxide, and a peroxidase enhancing agent of the invention.

The peroxidase enhancing agent of the invention may be included in the detergent as a part of a peroxidase system, comprising a peroxidase enzyme, a source of hydrogen peroxide, and the peroxidase enhancing agent of the invention.

The peroxidase system may be included in the detergent composition in the form of a non-dusting granulate, a liquid, in particular a stabilized liquid, or in a protected form. Non-dusting granulates may be produced, e.g., as disclosed in U.S. Pat. Nos. 4,106,991 and 4,661,452 (both to Novo Industri A/S) and may optionally be coated by methods known in the art. Liquid enzyme preparations may, for instance, be stabilized by adding a polyol such as propylene glycol, a sugar or sugar alcohol, lactic acid or boric acid according to established methods. Other enzyme stabilizers are well known in the art. A protected form of the peroxidase system may be prepared according to the method disclosed in EP 238,216.

The detergent composition of the invention may be in any convenient form, e.g. as powder, granules or liquid. A liquid detergent may be aqueous, typically containing up to 70% water and 0–20% organic solvent.

The detergent composition comprises one or more surfactants each of which may be anionic, non-ionic, cationic or amphoteric. The detergent will usually contain 5–30% of anionic surfactant such as linear alkylbenzenesulfonate (LAS), alpha-olefinsulfonate (AOS), alkyl sulfate (AS), alcohol ethoxysulfate (AES) or soap. It may also contain 3–20% of non-ionic surfactant such as nonylphenol ethoxylate or alcohol ethoxylate.

The detergent composition may additionally comprise one or more other enzymes, such as an amylase, lipase, cellulase or protease.

The detergent may contain 1–40% of a detergent builder such as zeolite, phosphate, phosphonate, citrate, nitrilotriacetic acid (NTA), ethylenediaminetetraacetic acid (EDTA) or diethylenetriaminepentaacetic acid (DTPA), alkenylsuccinic anhydride, or silicate, or it may be unbuilt (i.e. essentially free of a detergent builder). It may also contain other conventional detergent ingredients, e.g. fabric conditioners, foam boosters, anti-corrosion agents, soil-suspending agents, sequestering agents, anti-soil redeposition agents, stabilizing agents for the enzyme(s), foam depressors, dyes, bactericides, optical brighteners or perfumes.

The pH (measured in aqueous detergent solution) will usually be neutral or alkaline, e.g. 7–11.

Particular forms of detergent composition within the scope of the invention include:

a) A detergent composition formulated as a detergent powder containing phosphate builder, anionic surfactant, nonionic surfactant, silicate, alkali to adjust to desired pH in use, and neutral inorganic salt.

b) A detergent composition formulated as a detergent powder containing zeolite builder, anionic surfactant, nonionic surfactant, acrylic or equivalent polymer, silicate, alkali to adjust to desired pH in use, and neutral inorganic salt.

c) A detergent composition formulated as an aqueous detergent liquid comprising anionic surfactant, nonionic surfactant, organic acid, alkali, with a pH in use adjusted to a value between 7 and 11.

d) A detergent composition formulated as a non-aqueous detergent liquid comprising a liquid nonionic surfactant consisting essentially of linear alkoxylated primary alcohol, phosphate builder, alkali, with a pH in use adjusted to a value between about 7 and 11.

e) A compact detergent composition formulated as a detergent powder in the form of a granulate having a bulk density of at least 600 g/l, containing anionic surfactant and nonionic surfactant, phosphate builder, silicate, and little or substantially no neutral inorganic salt.

f) A compact detergent composition formulated as a detergent powder in the form of a granulate having a bulk density of at least 600 g/l, containing anionic surfactant and nonionic surfactant, zeolite builder, silicate, and little or substantially no neutral inorganic salt.

g) A detergent composition formulated as a detergent powder containing anionic surfactant, nonionic surfactant, acrylic polymer, fatty acid soap, carbonate, sulfate, clay particles, and silicate.

h) A liquid compact detergent comprising 5-65% by weight of surfactant, 0-50% by weight of builder and 0-30% by weight of electrolyte.

i) A compact granular detergent comprising linear alkylbenzenesulfonate, tallow alkyl sulfate, $C_{14-15}$ alkyl sulfate, $C_{14-15}$ alcohol 7 times ethoxylated, tallow alcohol times ethoxylated, dispersant, silicone fluid, trisodium citrate, citric acid, zeolite, maleic acid/acrylic acid copolymer, diethylenetriaminepentakis (methylenephosphonic acid), cellulase, protease, lipase, amylase, sodium silicate, sodium sulfate, PVP, perborate and bleach activator.

j) A granular detergent comprising sodium linear $C_{11-12}$ alkylbenzenesulfonate, sodium sulfate, zeolite A, sodium nitrilotriacetate, cellulase, PVP, tetraacetylethylenediamine, boric acid and perborate.

k) A liquid detergent comprising $C_{12-14}$ alkenylsuccinic acid, citric acid, sodium $C_{12-15}$ alkyl sulfate, sodium sulfate of $C_{12-15}$ alcohol 2 times ethoxylated, alcohol 7 times ethoxylated, $C_{12-15}$ alcohol 5 times ethoxylated, diethylenetriaminepentakis(methylenephosphonic acid), oleic acid, ethanol, propanediol, protease, cellulase, PVP, suds supressor, sodium hydroxide, perborate and bleach activator.

The following examples further illustrate the present invention, and they are not intended to be in any way limiting to the scope of the invention as claimed.

EXAMPLE 1

Bleaching of Direct Blue 1 and Half-life of Oxidized Enhancer

*Coprinus cinereus* peroxidase (CiP) obtained according to WO 92/16634, and purified to a single band on SDS-PAGE by the following method:

The crude peroxidase preparation was precipitated with 25% w/w ammoniumsulfate, and after centrifugation the precipitate was dissolved in 10 mM phosphate pH 7 (buffer A) and dialysed against the same buffer. The sample was applied onto a HighLoad Q-Sepharose column (Pharmacia, Sweden) equilibrated with buffer A, washed with buffer and eluted with a linear gradient of NaCl up to 0.5M in the same buffer.

The main fraction containing peroxidase activity was collected, concentrated by ultrafiltration (with a membrane cut-off of 10 kD) dialysed against buffer A.

The concentration of CiP was determined by $A_{404}$ using a molar absorption of 109 $mM^{-1}$ $cm^{-1}$.

Chemicals were obtained from Sigma-Aldrich, Janssen Chimica, Kodak, Tokyo Kasai Organic Chemicals, Daiichi Pure Chemicals co. or Boehringer Mannheim.

The initial bleaching of Direct Blue 1 (DB1) by CiP using a selection of enhancers according to the invention was compared to the half-life of the oxidized enhancer (electron acceptor) measured under standard conditions.

| Conditions for bleaching: | Final concentration |
| --- | --- |
| 200 µl 50 mM Britton-Robinson* buffer pH 8.5 and 10.5, respectively | 10 mM |
| 200 µl DB1 - 3.0 Abs. Units (610 nm) | 0.6 ($A_{610 nm}$) |
| 200 µl 10 nM CiP (pH 8.5) or 5 nM CiP (pH 10) | 2 or 1 nM |
| 200 µl 50 µM enhancer | 10 µM |
| 200 µl 100 µM $H_2O_2$ | 20 µM |
| *$H_3PO_4$, $CH_3CO_2H$, $H_3BO_3$, all three compounds: | 50 mM |

Reagents were mixed in a thermostated cuvette at 30° C. and the bleaching was started by addition of hydrogen peroxide.

The bleaching was detected spectrophotometrically at 610 nm, which is the absorption peak of DB1. After 5 seconds the bleaching was followed for at least 1 minute, and the initial bleaching rates (reduction in milli-absorbance units per minute, $-\Delta mAbs/min$, determined from the initial slope of the absorbance curve) were determined.

The half-life of the oxidized enhancers were determined from a cyclic voltammogram of the enhancers present at a concentration of 8 mM. The cyclic voltammograms were obtained in a standard three-electrode system consisting of

| Working electrode | Platinum disc |
| --- | --- |
| Counter electrode | Platinum wire |
| Reference electrode | Calomel |

The half-life ($t_{1/2}$) of the oxidized enhancers was calculated from the scan rates (v), peak positions and switching potential in a cyclic voltammogram in which the peak current of the reducing peak had half the value of the peak current of the oxidizing peak.

$$t_{1/2} = \frac{\Delta E}{v}$$

$\Delta E$ is the difference of the peak position of the reducing peak and the switching potential.

The switching potential was fixed at a potential 0.2 V higher than the peak position of the oxidizing peak in a reversible voltammogram. A reversible voltammogram is obtained at scan rates at which the difference between the peak positions of the oxidizing and reducing peak approaches 0.059 V.

TABLE 1

Initial Bleaching and Half-life of the Oxidized Enhancer

| | pH 8.5 | | pH 10.5 | |
|---|---|---|---|---|
| Enhancer | $t_{1/2}$ seconds | bleaching −ΔmAbs/min | $t_{1/2}$ seconds | bleaching −ΔmAbs/min |
| 2-acetyl-10-methyl-phenothiazine | 3.5 | 27 | 0.2 | 25 |
| methyl-10-pheno-thiazine-propionate | 8.5 | 72 | 1 | 99 |
| 10-methyl-phenothiazine | 17.5 | 240 | 1.5 | 480 |
| 10-phenothiazine propionic acid | 37.5 | 486 | 2 | 468 |
| 10-ethyl-4-pheno-thiazine-carboxylic acid | 45 | 816 | 2.5 | 864 |

Figure 2:
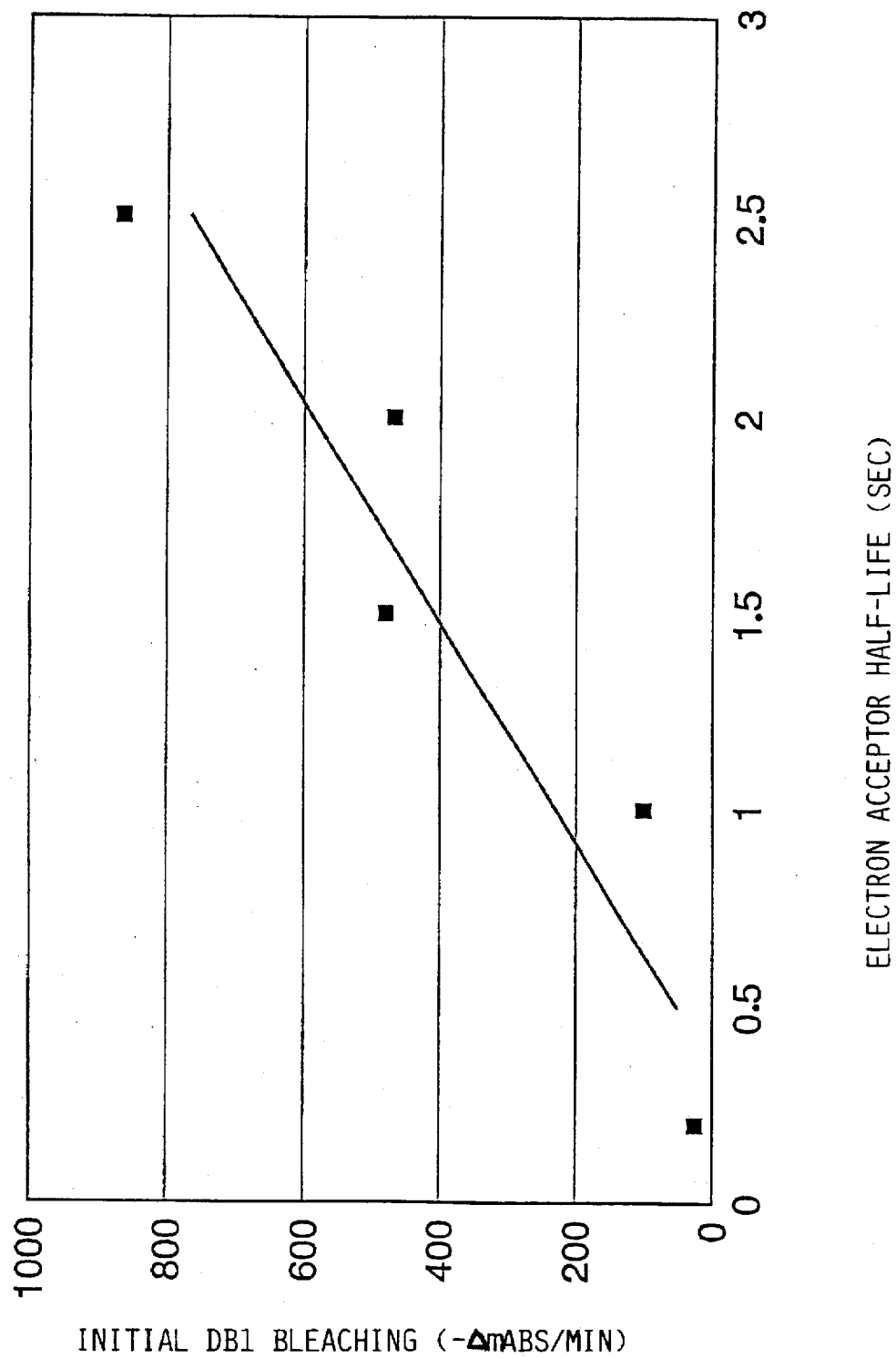
FIG. 2 shows the initial DB1 bleaching (−ΔmAbs/min) as a function of the electron acceptor half-life (seconds) at pH 10.5.

From the results shown in FIGS. 1 and 2 it can be seen that oxidized enhancer shows better bleaching with longer half-life.

EXAMPLE 2

Bleaching of Methyl Orange

Accelerated bleaching of Methyl Orange (Merck) catalysed by a recombinantly produced *Coprinus cinereus* peroxidase (CiP), obtained according to Example 1, and hydrogen peroxide in the presence of 2,2'-azino-bis (3-ethylbenzothiazoline-6-sulfonate) (ABTS, supplied by Boehringer Mannheim) or para-hydroxybenzene sulfonate (pHBS, supplied by Sigma) is shown in FIG. 2. The following conditions were used:

10 nM CiP
25 µM Methyl Orange
50 µM ABTS or para-hydroxybenzene sulfonate
20 and 200 µM hydrogen peroxide
50 mM Britton & Robinson buffer, pH 8.8
30° C. thermostat Reagents were mixed in a 1 cm cuvette, and the bleaching was started by addition of hydrogen peroxide. The bleaching was detected spectrophotometrically at 465 nm, which is the absorption peak of this dye. Bleaching was followed with respect to time over a span of 10 min.

EXAMPLE 3

Bleaching of Methyl Orange

Figure 3:
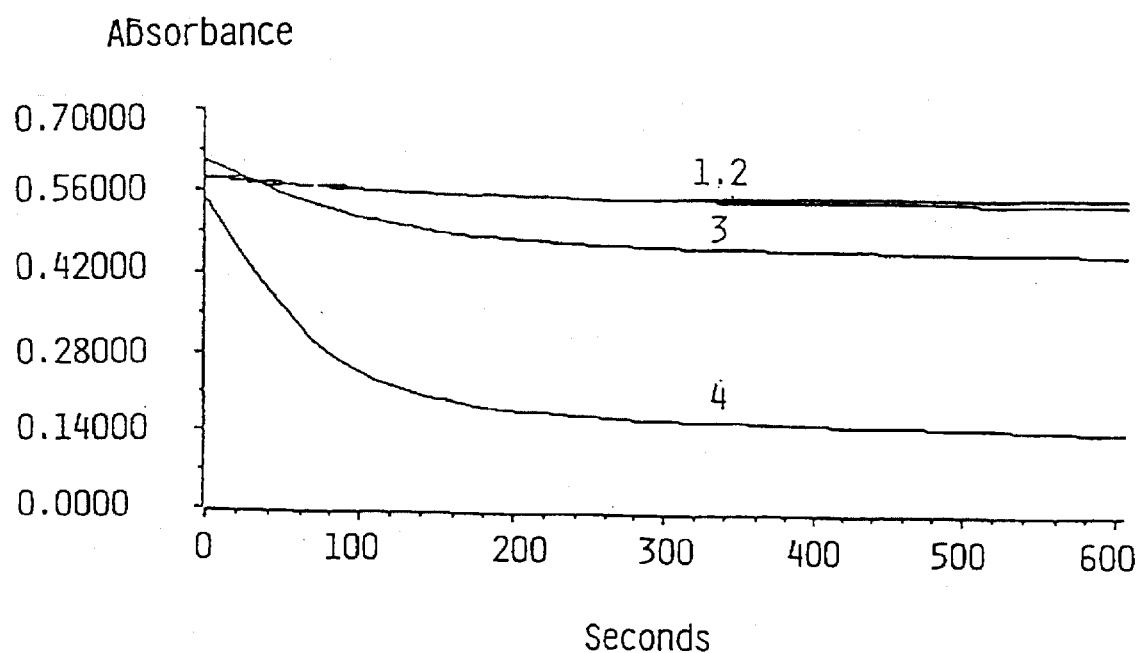
FIG. 3 shows a comparison of a peroxidase enhancing agent of the invention (ABTS) and pHBS, applied to bleaching of Methyl Orange by a *Coprinus cinereus* peroxidase (1: pHBS, 20 μM $H_2O_2$; 2: pHBS, 200 μM $H_2O_2$; 3: ABTS, 20 μM $H_2O_2$; 4: ABTS, 200 μM $H_2O_2$)

Accelerated bleaching of Methyl Orange (Merck) catalysed by a recombinantly produced *Coprinus cinereus* peroxidase (CiP), obtained according to Example 1, and hydrogen peroxide in the presence of varying concentrations of 2,2'-azino-bis (3-ethylbenzothiazoline-6-sulfonate) (ABTS, supplied by Boehringer Mannheim) is shown in FIG. 3. The following conditions were used:

10 nM CiP
25 µM Methyl Orange
0, 1, 5 and 10 µM ABTS
200 µM hydrogen peroxide
50 mM Britton & Robinson buffer, pH 8.8
30° C. thermostat Mixture, start and detection of the bleaching are as described in.

EXAMPLE 4

Bleaching of Direct Blue 1

The initial bleaching of Direct Blue 1 (DB1) by recombinantly produced *Coprinus cinereus* peroxidase (CiP), obtained according to Example 1, using ABTS as accelerator was compared to the best of the hitherto known accelerators: 7-hydroxycoumarin (7 HCm), vanillin (VAN), and p-hydroxybenzene sulfonate (pHBS). The following conditions were used:

1 nM CiP or 100 nM CiP (at pH 10.5)
0, 10, 25, 50, or 75 µM accelerator, respectively
50 mM Britton & Robinson buffer, pH 8.8 or 10.5, respectively
20 µM hydrogen peroxide Reagents were mixed in a 1 cm cuvette, and the bleaching was started by addition of hydrogen peroxide. The bleaching was detected spectrophotometrically at 610 nm, which is the absorption peak of this dye. Bleaching was followed for 10 minutes, and the bleaching rates (−ΔmAbs/min) were determined from the initial (linear) reduction in absorbance.

At pH 10.5 the bleaching using 100 nm CiP and ABTS as accelerator was so fast that bleaching was already completed before the cuvette could be placed in the spectrophotometer, the reason why the dosage of rCiP at pH 10.5 was reduced to 1 nM when used in combination with ABTS, although a dosage near 100 nM rCiP was necessary for all other (hitherto known) accelerators in order to see a significant reduction in absorbance.

Figure 4:
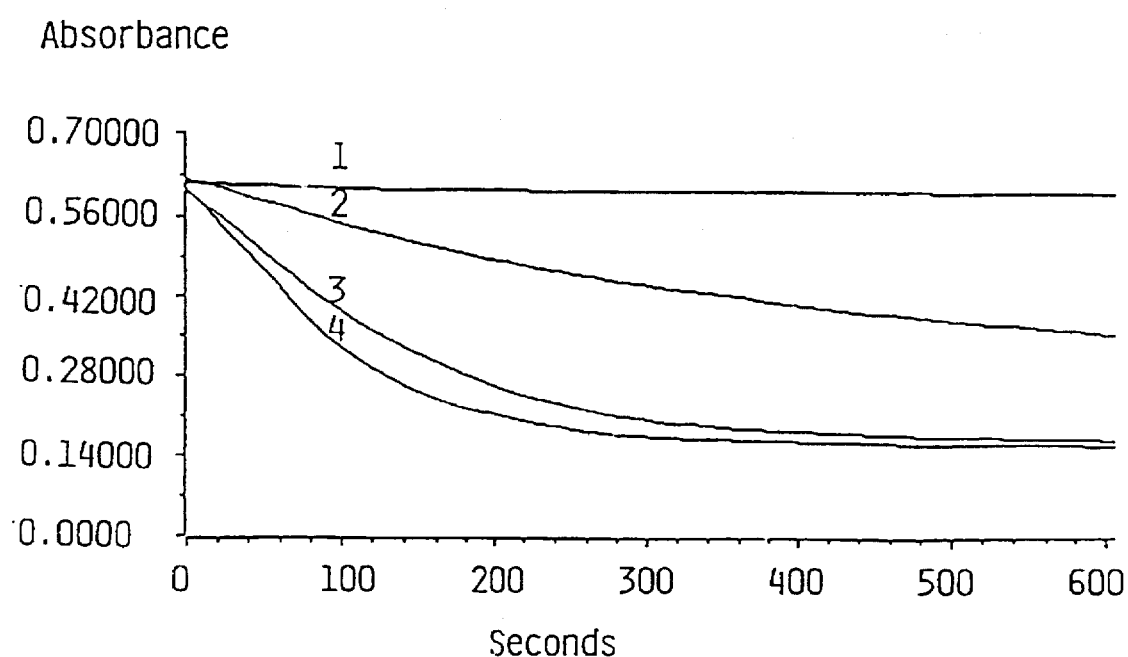
FIG. 4 shows accelerated bleaching of Methyl Orange by a *Coprinus cinereus* peroxidase in the presence of varying concentrations of a peroxidase enhancing agent of the invention (ABTS) (1: 0 μM ABTS; 2: 1 μM ABTS; 3: 5 μM ABTS; and 4: 10 μM ABTS)
Figure 5:
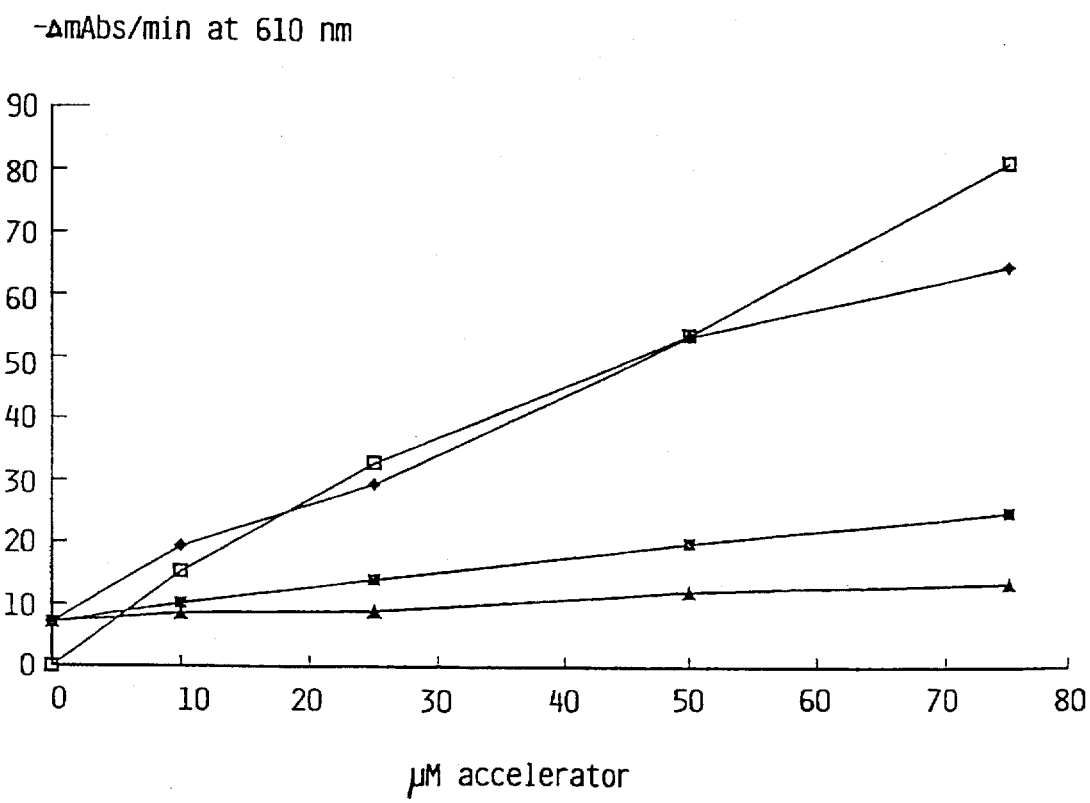
FIG. 5 shows a comparison of the initial bleaching rates during bleaching of Direct Blue 1 (DB1) at pH 10.5 (□ ABTS, 1 nM peroxidase; ♦ VAN, 100 nM peroxidase; ■ 7 HCm, 100 nM peroxidase; ▼ pHBS, 100 nM peroxidase)
Figure 6:
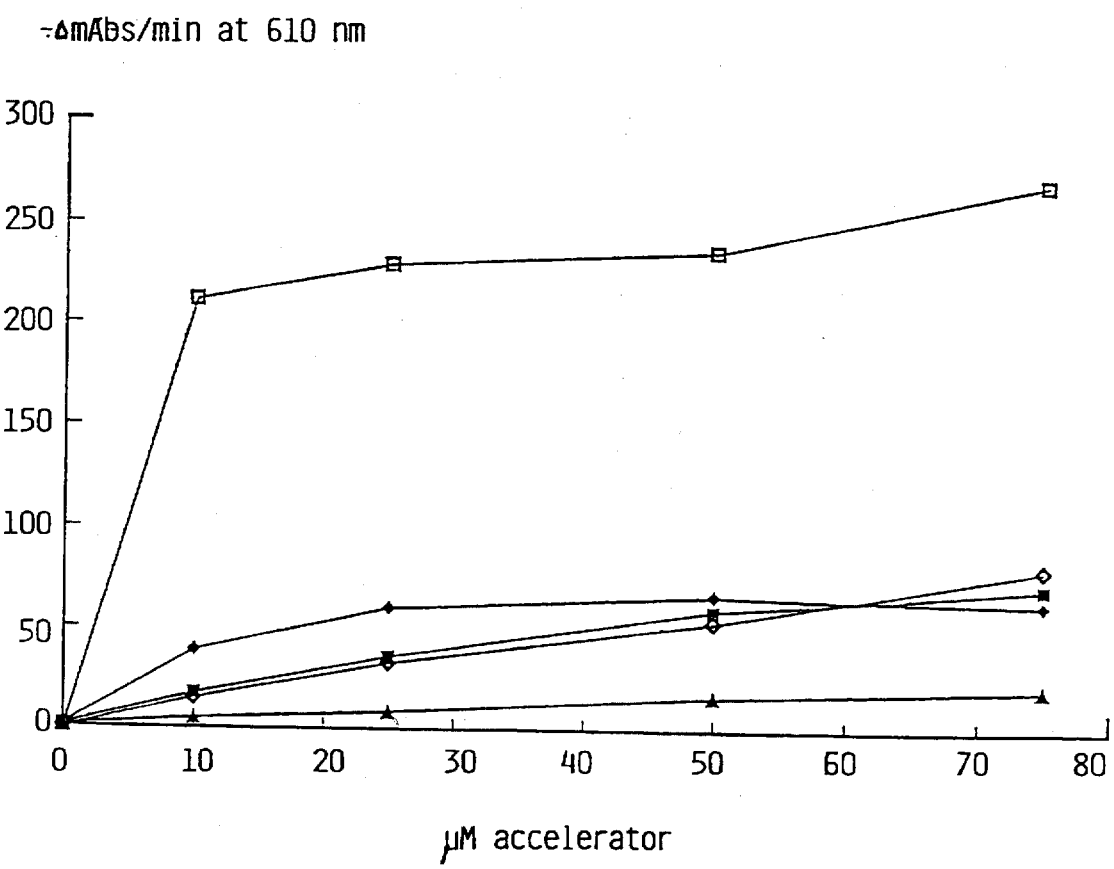
FIG. 6 shows a comparison of the initial bleaching rates during bleaching of DB1 at pH 8.8 (and pH 10.5) (□ ABTS pH 8.8; ♦ VAN pH 8.8; ■ 7 HCm pH 8.8; 0 ABTS pH 10.5; and ▼ pHBS pH 8.8).

The results of initial bleaching rate per minute have been illustrated in FIGS. 4 and 5 as function of accelerator concentration.

EXAMPLE 5

Enhanced Dye Transfer Inhibition by ABTS

A washing trial was carried out in a Terg-o-tometer to investigate the effect of ABTS on peroxidase based dye transfer inhibition. For a comparison, also the established enhancer pHBS was tested.

Clean white tracer test pieces (cotton, Style#400 from Testfabrics, Inc., USA; bleached, but unbrightened) were washed together with nylon test pieces dyed with the azo dye Acid Red 151 (C.I. 26900; available, e.g. from Aldrich Chemical Co.). Reference test pieces were cut out of the same cotton cloth and washed in the absence of dyed fabric. The dye transfer in a given Terg-o-tometer pot was measured as the Hunter color difference $$\Delta E = \sqrt{(\Delta L)^2 + (\Delta a)^2 + (\Delta b)^2}$$

between the tracer pieces in that pot and the above reference pieces, the Hunter L, a, and b values being evaluated from remission data obtained with an unfiltered daylight source on a Datacolor Elrephometer 2000.

The detergent solution for the washing trial was made up using 4.5 g/l of a commercially available European high-pH powder detergent containing no bleach and no optical brightener. The water used was tap water mixed with demineralized water in the ratio 1:2; the mixture had a hardness equivalent to approx. 1.1 mM $Ca^{2+}$.

The detailed experimental conditions were:

Duration of wash: 15 min.
Terg-o-tometer agitation: 70 rotations/min.
Temperature: 35° C.
pH: Adjusted to 10.5 with NaOH prior to addition of peroxidase system
Textile load: Approx. 6 g nylon dyed with acid Red 151 and 1 g white cotton per liter washing liquor Peroxide source: In all cases, 50 µM $H_2O_2$ was present together with the peroxidase Peroxidase: Recombinantly produced *Coprinus cinereus* peroxidase, obtained according to Example 1, at 5 nM After washing, the test pieces were rinsed thoroughly in cold tap water and dried in the dark overnight, after which the remission measurements were performed.

Treatments with various concentrations of the two enhancers yielded the following results:

|  | Hunter ΔE with respect to white, washed fabric |
|---|---|
| 1 µM ABTS | 34.9 |
| 5 µM ABTS | 32.3 |
| 20 µM ABTS | 23.7 |
| 1 µM pHBS | 34.8 |
| 5 µM pHBS | 34.5 |
| 20 µM pHBS | 30.8 |

Differences of ≧2 units of Hunter ΔE were statistically significant.

In both cases, the peroxidase system with 1 µM enhancer provided no significant dye transfer inhibition (reference without peroxidase system not included here). However, as is seen, the ABTS system has an effect already at 5 µM of enhancer, whereas the pHBS system does not; and at 20 µM enhancer, the ABTS system has a much larger effect than the pHBS system.

EXAMPLE 6

Stability of ABTS Radical

The stability of the ABTS radical formed by oxidation of ABTS with a recombinantly produced *Coprinus cinereus* peroxidase (rCiP), obtained according to Example 1, was studied by electron spin resonance technique (ESR). The ESR signal was calculated after 20 scans, where the area under curve corresponds to the concentration of the radical. The signal was integrated from 3260 Gaus to 3300 Gaus.

The stability of the radical was determined in 0.1M Britton & Robinson buffer at different pH values. A concentration of 2.27 mM $H_2O_2$ and an enzyme concentration 34 PODU/ml was applied.

Peroxidase Activity

One peroxidase unit (PODU) is defined as the amount of enzyme which, under standard conditions (i.e. pH 7.0; temperature 30° C.; reaction time 3 minutes), catalyses the conversion of 1 µmol hydrogen peroxide per minute. The activity is determined using an assay based on ABTS (2,2'-azino-bis (3-ethylbenzothiazoline-6-sulfonate)) as the chromophore, the greenish-blue colour produced being photometered at 418 nm.

The results are presented in Table 1 below.

TABLE 3

| | | Stability of ABTS Radical | |
|---|---|---|---|
| pH | $t_{1/2}$ (h) | Initial concentration (mM) | $t_{1/2}$ calculated to 250 µM (h) |
| 3 | 83 | 0.45 | 149 |
| 4 | 66 | 0.45 | 119 |
| 6 | 6.75 | 0.45 | 12 |

TABLE 3-continued

| | | Stability of ABTS Radical | |
|---|---|---|---|
| pH | $t_{1/2}$ (h) | Initial concentration (mM) | $t_{1/2}$ calculated to 250 µM (h) |
| 7 | 1.4 | 0.24 | 2.5 |
| 8.7 | 0.67 | 0.24 | 1.2 |

The half-lives in Table 3 measured at different concentrations have for comparison been calculated to a concentration of 250 µM assuming a 2nd order decay.

EXAMPLE 7

The half-life of vanillin and 7-hydroxycoumarin was determined from cyclic voltammograms of the enhancers. The cyclic voltammograms were obtained in a three-electrode system consisting of

| Working electrode | Platinum disc |
|---|---|
| Counter electrode | Platinum wire |
| Reference electrode | Calomel |

The concentration of the enhancers was 2 mM.

The order of the decay reaction of the oxidized enhancers was determined from the dependence of the peak position of the oxidizing peak ($E_{po}$) on the scan rate (v). For both enhancers ($\delta E_{po}/\delta \log v$)=0.019 V in the scan rate range 0.1–1.0 V/s showing that the decay reaction is 2nd order.

The rate constant of the decay reaction of the oxidized enhancers was determined from a comparison of the experimental cyclic voltammograms with simulated voltammograms. The parameters needed for the simulation are the reaction order of the decay reaction, the concentration of the enhancer, the scan rate of the rate constant for the decay reaction as described in Analytical Chemistry, Vol. 60, p. 1159, 1988.

For both vanillin and 7-hydroxycoumarin a rate constant for the decay reaction in the order of $10^8 M^{-1} s^{-1}$ was found.

For a concentration of 250 µM the half life can be calculated to approximately 40 µs.

EXAMPLE 8

Bleaching of Direct Blue 1 and Half-life of Oxidized Enhancer

*Corpinus cinereus* peroxidase (CiP) was obtained as described in Example 1.

The buffer used was a Britton Robinson buffer 0.02M with respect to all the three components ($H_3PO_4$, $CH_3CO_2H$, $H_3BO_3$). The enzyme was dissolved in Milli-Q water to a concentration of 10,000 PODU/ml (50,000 nM).

Stock solutions were made of all the tested enhancers in DMF/$H_2O$ (1/1).

The following conditions were used to examine the bleaching effect:

| | |
|---|---|
| $H_2O_2$ | 20 μM |
| CiP | 1 or 2 nM (pH 9.5 or pH 10.5) |
| DB 1 | 0.025 mg/ml |
| Accelerator | 10 μM |
| DMF | 0.1% |
| B-R buffer | 0.02 M (pH 8.5 or 10.5) |
| Temperature | room temperature |

Peroxidase, DB 1 and enhancer were mixed with buffer in a cuvette, placed in the spectrophotometer and $H_2O$ was added just before the start of the experiment. The concentration of the enzyme was 1 nM at pH 8.5 and 2 nM at pH 10.5.

The change in absorbance of the dye at 598 nm was measured as a function of time from 5 to 305 seconds. To quantify the accelerator effect the bleaching (dabs) in 300 seconds is calculated:

$\Delta Abs(\%)=((Abs\ 300\ sec.-Abs\ 10\ sec.)/Abs\ 10\ sec.)\ 100\%.$

The half-life of the different benzidine derivatives was measured by cyclic voltametri (CV) in $DMF/H_2O$ buffer (1/9) at pH 8.5 and 10.5 as described in. The concentration of the benzidines were 2 mM, and the half-life ($t_{1/2}$) of the compounds is referring to a two electron transfer.

TABLE 2

Bleaching of Direct Blue 1 and Half-life of Oxidized Enhancer

| Accelerator | pH 8.5 −ΔABS (%) | pH 10.5 −ΔABS (%) | $t_{1/2}$(sec) pH 8.5 | pH 10.5 |
|---|---|---|---|---|
| benzidine | 20 | 34 | 0.05 | 0.05 |
| o-tolidine | 40 | 54 | 0.20 | 0.21 |
| 3,3'-dimethoxy-benzidine (o-dianisidine) | 50 | 47 | 0.22 | 0.23 |
| 3,3',5,5'-tetra-methyl-benzidine | 64 | 62 | 4.5 | 5 |

EXAMPLE 9

Oxidation of Enhancer

The apparent kinetic constants for the oxidation of some of the enhancers of the invention, 10-ethyl-4-phenothiazinecarboxylic acid (EPC) and 10-phenothiazinepropionic acid (PTP), were determined using CiP (4nM for PTP and 3.1 nM for EPC), borate buffer (10 mM) pH 8.5, $H_2O_2$ (50 μM) and varied concentrations of enhancer, 30° C. Formation of oxidized enhancer was monitored at 514 nm.

| Enhancer | $K_m$ (app) μM | $V_{max}$ μM/s | $K_{cat}$ (app.) $s^{-1}$ | $1/k_{cat}$ (app.) ms |
|---|---|---|---|---|
| EPC | 31 ± 4 | 3.1 ± 0.2 | 997 ± 64 | ~1 |
| PTP | 53 ± 12 | 2.7 ± 0.5 | 671 ± 124 | ~1.5 |

When $K_{cat}$ (app.) is defined as the turnover number calculated as $V_{max}/[CiP]_o$, where $[CiP]_o$ is the initial concentration of CiP.

The stability of the oxidized enhancer (electron acceptor) was determined using a high concentration of CiP (107 uM).

Britton-Robinson buffer (10 mM) pH 8.5, $H_2O_2$ (50 μM) and varied concentrations of enhancer (20–100 μM), 30° C.

After a very fast formation of oxidized enhancer the decay could be followed by the absorbance at 514 nm.

For both oxidized enhancers was found a second order decay with the following constants:

EXAMPLE 10

Stoichiometry of $H_2O_2$, Dye and Enhancer

To determine the stoichiometry between $H_2O_2$ and methyl orange (MO) the following conditions were used:

10 mM Britton-Robinson buffer pH 8.8
10 nM CiP (obtained according to Example 1)
0–150 μM MO
10 μM ABTS
220 μM $H_2O_2$
30° C.

Reagents were mixed in a 1 cm cuvette, and the bleaching was started by addition of $H_2O_2$. The bleaching was detected spectrophotometrically at 465 nm for up to 5 hours.

The breakpoint of the obtainable bleaching for various MO concentrations was obtained at 110 μM MO giving a $H_2O_2$:MO stoichiometry of 2:1 or a transfer of 4 electrons.

Using the above system, but $H_2O_2$, in excess (440 μM), MO bleaching was linear up to 150 μM MO, which gives a stoichiometry of ABTS:MO of 1:(at least)15.

We claim:

1. A detergent additive comprising an enzyme exhibiting peroxidase activity, a source of hydrogen peroxide, and an enhancer capable of being oxidized by the peroxidase exhibiting activity, wherein the oxidized enhancer is an electron acceptor having a half-life greater than the inverse of the turnover number of the oxidation of the enhancer present in the amount of about 0.1–250 μM wherein said enhancer is 2,2-azino-bis (3-ethylbenzothiazoline-6-sulfonate, and wherein the additive inhibits the transfer of a textile dye from a first dyed fabric to a second fabric when said fabrics are washed together.

2. A detergent additive according to claim 1, provided in the form selected from the group consisting of a non-dusting granulate, a stabilized liquid, a slurry, or a protected enzyme.

3. A detergent composition comprising the detergent additive of claim 1.

4. A detergent composition according to claim 3, which further comprises one or more other enzymes selected from the group consisting of a protease, a lipase, an amylase, a cellulase, an oxidase or a mixture hereof.

5. The detergent additive of claim 1, wherein the concentration of the enhancer is in the range of 1–100 μM.

* * * * *